United States Patent Office 3,010,832
Patented Nov. 28, 1961

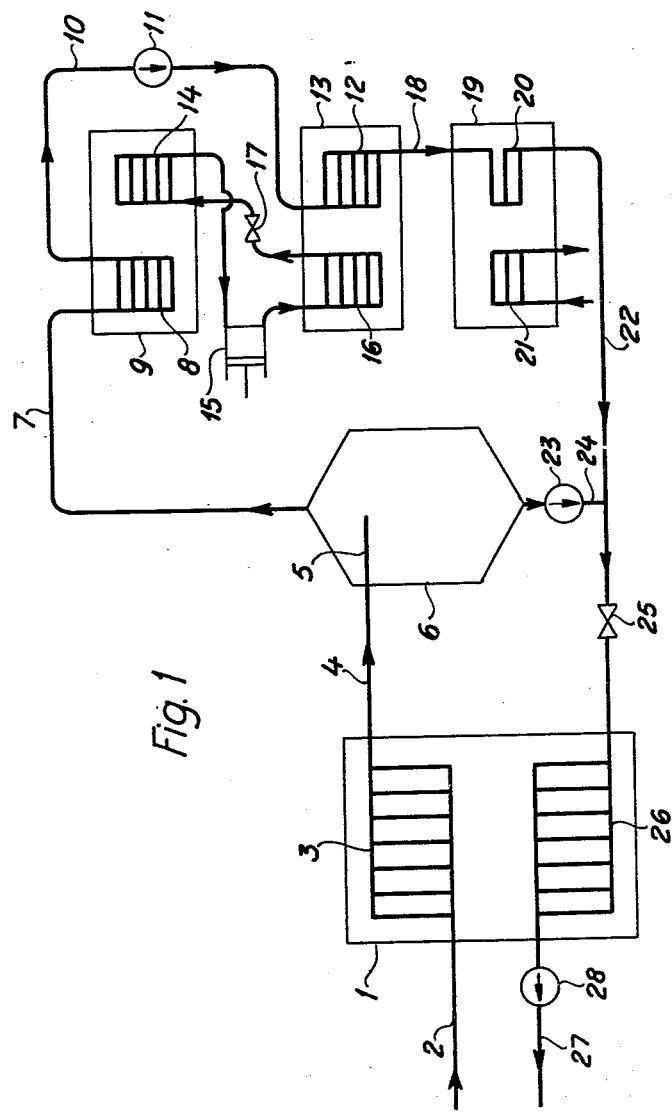

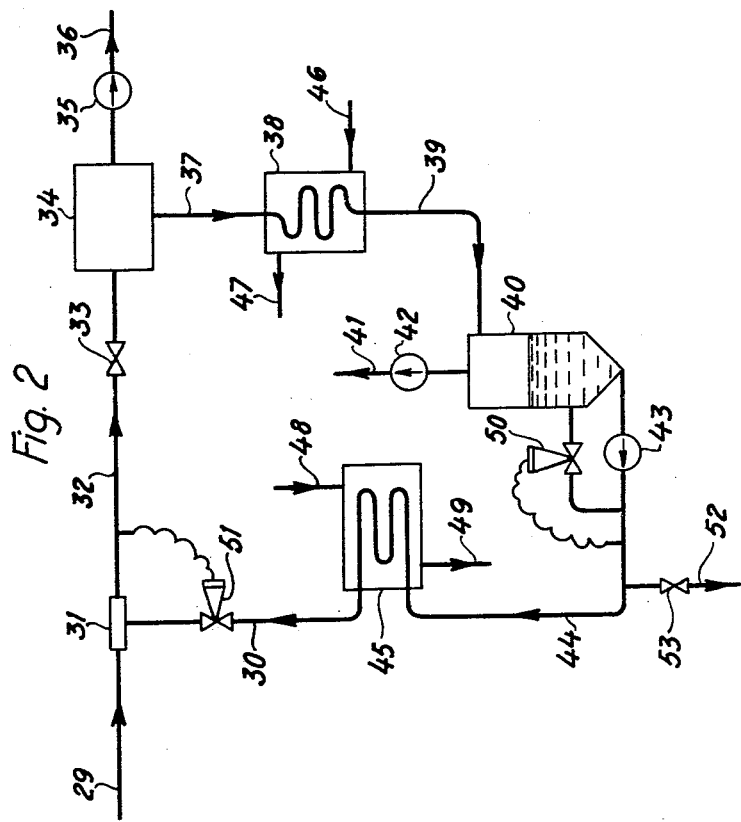

3,010,832
METHOD AND APPARATUS FOR CONTINUOUS HEAT-TREATMENT OF HEAT-SENSITIVE LIQUIDS
Per A. Dahlstedt, Stockholm, Sweden, assignor to Aktiebolaget Separator, Stockholm, Sweden, a corporation of Sweden
Filed Dec. 4, 1958, Ser. No. 778,131
Claims priority, application Sweden Dec. 11, 1957
5 Claims. (Cl. 99—212)

This invention relates to the heat treatment of heat-sensitive liquids and has particular reference to an improved method and apparatus for this purpose.

It is known to continuously pasteurize or sterilize liquids sensitive to heat, such as milk or fruit juices, by boiling off vapor from the liquid at a temperature below the temperature detrimental to the liquid, this being effected in an expansion vessel from the bottom of which the liquid is discharged while the vapor is discharged from the top of the vessel. The discharged vapor is compressed and fed again into the liquid which has been preheated to a temperature below the detrimental temperature. In this way, the temperature of the liquid is raised to the sterilizing temperature. The liquid is then rapidly cooled by being fed into the above-mentioned expansion vessel. The advantage of this method is that by addition of compressed vapor, it is possible to bring the pre-heated liquid rapidly up to sterilizing temperature and then cool the liquid rapidly by boiling off vapor. Thus, the liquid can be kept for a very short time above the detrimental temperature and be sterilized without any appreciable damage. Expressing it more definitely, this method avoids contacts of the liquid with hot surfaces in a heat exchanger and thereby acquiring a burned or "cooked" taste.

The vapor compressor used in this method, however, occupies much space, is expensive and requires much energy, and it may therefore be desirable to eliminate it. According to the present invention, which enables such elimination, the liquid is partly vaporized at a temperature below the temperature detrimental to the liquid, the generated vapor is condensed by cooling, the condensate is heated under increased pressure and supplied to liquid to be heat-treated, and the liquid thus heated is rapidly cooled down, by boiling off vapor, to a temperature below the detrimental temperature. The heat recovered in the vapor condensation can be utilized by conventional methods of heat technology, such as the use of a heat pump, for any desired purpose, such as for the heating of the condensate.

When treating milk, for example, it may be desirable, before the first vaporization, to heat the liquid and subject it to a vacuum so that gases dissolved in it are removed (deodorization). An alternative for deodorizing is to subject the condensate to the vacuum. In this way, the gases originally dissolved in the liquid are removed and escape with the steam being boiled off.

The invention also includes an apparatus for carrying out the method. The apparatus comprises an expansion vessel having an inlet for the liquid being treated and an outlet each for liquid and vapor separated in the vessel, a pipe connected to the vapor outlet, and a cooler, a pump, a heater and a pressure reduction valve inserted one after the other in the pipe, reckoning in the direction of flow. The heater may constitute the primary side and the cooler the secondary side of a heat exchanger.

The invention is described in more detail below with reference to the attached drawings. In the drawings, FIGS. 1 and 2 show, diagrammatically and by way of example, two different forms of apparatus for carrying out the new method.

In the following, it is assumed that the liquid to be sterilized is milk, that temperatures above about 75° C. are detrimental to the milk, and that the sterilization can be effected at 135° to 150° C.

In FIG. 1, the reference numeral 1 denotes a plate heat exchanger. The milk, deodorized by vacuum treatment and preheated to about 65° C., enters the primary side 3 of the heat exchanger, through a pipe 2. The outlet line 4 of the heat exchanger opens through a dispersion nozzle 5 into an expansion vessel 6, where a vacuum is maintained such that the temperature in the vessel, and consequently on the primary side 3 of the heat exchanger, is maintained at about 65° C. This means that substantially all the heat supplied to the primary side 3 is consumed for generating steam with a temperature of 65° C. This heat is calculated to provide steam in the amount of 14% of the weight of the milk. While the milk is falling to the bottom of the expansion vessel 6, the steam boiled off escapes from the top of the vessel through a pipe 7 and is condensed by cooling in the section 8 of a plate heat exchanger 9. Condensed water with a temperature of 65° C. leaves the section 8 through a pipe 10 in which a pump 11 is inserted. This pump, which maintains the vacuum in the vessel 6, feeds the condensed water into the section 12 of a plate heat exchanger 13, where the water is vaporized by means of heat which the section 14 of the heat exchanger 9 has taken up in the condensation of steam in the section 8. This heat is transmitted, through a volatile liquid heat transfer medium such as Freon (a fluorinated, aliphatic hydrocarbon), by a heat-pump 15 to the section 16 of the heat exchanger 13. In the pipes between the sections 14 and 16 is inserted a valve 17 for regulating the flow rate of the heat transfer medium and thus the magnitude of the heat exchange between the heat exchangers 9 and 13.

The steam generated in the section 12 passes through a pipe 18 to a heat exchanger 19 where it is superheated, in the section 20, to more than 150° C. by means of steam which is supplied to the section 21 if the sterilization is to be carried out at 150° C. The superheated steam from section 20 then passes through a pipe 22 into which, by a pump 23, milk at a temperature of 65° C. is fed from the bottom of the vessel 6 through a pipe 24. Thus, the milk entering pipe 22 from pump 23 is rapidly brought to a temperature of 150° C. It then passes through a pressure reduction valve 25 inserted in the pipe 22, so that the milk is rapidly cooled down to 70° C. by boiling off 14% by weight of steam. The steam thus generated is then substantially condensed during passage through the secondary side 26 of the heat exchanger 1, and the milk leaves the latter at a temperature of 70° C. through a discharge pipe 27 in which a pump 28 is inserted. The preheating of the milk entering through the pipe 2, and the cooling of the milk leaving through the pipe 27, can take place in plate heat exchangers (not shown).

In FIG. 2, milk preheated to about 65° C. is fed through pipe 29 into the heat-treating plant. By blowing in steam under pressure from a pipe 30, as through a spray-nozzle-like injection nozzle 31, the temperature of the milk is rapidly raised to 135° C., for example. The milk then flows through a pipe 32 and passes through a pressure reduction valve 33 inserted in this pipe. Here, a reduction of the pressure takes place while steam is being boiled off, whereby the milk temperature is rapidly lowered to 69° C., for example. The mixture of milk and steam then flows into an expansion vessel 34 where the milk separates from the steam and is discharged, through an outlet 36, by a pump 35 maintaining the necessary vacuum in the vessel 34. The steam separated off passes through a pipe 37 to a cooler 38 where the steam is condensed. The condensed water flows on through a pipe 39 to a vessel 40 where air and other gases separate from the condensed water and are sucked away, through a pipe 41, by a vacuum pump 42. In this way, the necessary deodorization of the milk takes place. From the bottom of the vessel 40, the condensed water is fed by a pump 43 through a pipe 44 to a heater 45. In the latter, the water is vaporized under such a pressure that the generated steam can be blown through the pipe 30 and into the milk flowing through the pipe 29, 32, thereby heating the milk to the above-mentioned temperature of 135° C.

With a heat-pump arrangement similar to that described in the embodiment according to FIG. 1, a heat transfer medium can transmit, via the pipes 46 and 47 of the cooler 38 and the pipes 48 and 49 of the heater 45, the condensation heat recovered in the cooler 38 to the heater 45, where it is utilized for vaporizing the condensed water. The necessary additional heat in the heater 45 can be obtained by means of steam from a steam boiler. To regulate the quantity of steam supplied to the nozzle 31, there can be inserted in the pipe 44 an automatically operating, pressure-governed return valve 50 which returns condensed water to the vessel 40 if the pressure in the pipe 44 becomes too high. In the pipe 30, in turn, an automatically operating temperature-governed throttle valve 51 can be built in, which regulates the steam supply to the nozzle 31 so that the milk is automatically heated to the desired sterilizing temperature. If it is desired to obtain a certain concentration of the milk, a suitable quantity of condensed water can be drawn off from the pipe 44 by means of a valve 53 inserted in a discharge outlet 52. The preheating of the milk entering through the pipe 29, and the cooling of the milk leaving through the pipe 36, can take place in a plate heat exchanger (not shown).

To facilitate the heat transfer from the heat exchanger 9 to the heat exchanger 13 in FIG. 1, or from the cooler 38 to the heater 45 in FIG. 2, an additional pump (not shown) can be inserted in the pipe 22 or 30, respectively.

I claim:
1. A method for continuously heat-treating liquids sensitive to heat, which comprises vaporizing part of the liquid at a temperature below the temperature detrimental to the liquid, condensing the resulting vapor by cooling, heating the resulting condensate under elevated pressure sufficiently to transfer said condensate into vapor, feeding said last vapor to liquid which is to be heat-treated, thereby heating said liquid, and rapidly boiling off vapor from said heated liquid sufficiently to cool said last liquid to a temperature below said detrimental temperature.

2. A method according to claim 1, comprising also the steps, prior to said first vaporizing, of heating the liquid and subjecting the heated liquid to a vacuum to remove dissolved gases therefrom.

3. A method according to claim 1, comprising also the step of subjecting said condensate to a vacuum to remove dissolved gases therefrom.

4. Apparatus for heat-treating liquids sensitive to heat, which comprises an expansion vessel having an inlet for the liquid to be treated, said vessel also having an outlet for the liquid and an outlet for vapor separated from the liquid in the vessel, a pipeline leading from said vapor outlet, elements including a cooler, a pump, a heater and a pressure reduction valve inserted in said pipeline in the order mentioned, reckoned in the direction of flow, and a pipe leading from said liquid outlet to said pipeline at a point between said heater and said pressure reduction valve.

5. Apparatus according to claim 4, in which said heater and said cooler form, respectively, the primary side and the secondary side of a heat exchanger.

References Cited in the file of this patent
UNITED STATES PATENTS

| | | |
|---|---|---|
| 2,285,520 | Keyser | June 9, 1942 |
| 2,470,936 | Lo Gerfo | May 24, 1949 |
| 2,712,504 | Coulter | July 5, 1955 |